(12) United States Patent
Prakash et al.

(10) Patent No.: US 10,158,448 B2
(45) Date of Patent: Dec. 18, 2018

(54) MULTILAYER RESOURCE MANAGEMENT AND ARBITRATION IN TRANSPORT NETWORKS

(71) Applicant: Ciena Corporation, Hanover, MD (US)

(72) Inventors: Anurag Prakash, Noida (IN); Piyush Sharma, Gurgaon (IN); Alexander G. Young, Ottawa (CA); Matthew Yuen, Ottawa (CA); Alwyn Joy George, New Delhi (IN); Risheek Puri, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 237 days.

(21) Appl. No.: 15/048,145

(22) Filed: Feb. 19, 2016

(65) Prior Publication Data

US 2017/0201323 A1 Jul. 13, 2017

(30) Foreign Application Priority Data

Jan. 8, 2016 (IN) .............................. 201611000731

(51) Int. Cl.
*H04B 10/27* (2013.01)
*H04J 14/08* (2006.01)
(Continued)

(52) U.S. Cl.
CPC ............ *H04J 14/08* (2013.01); *H04L 69/321* (2013.01); *H04Q 11/0001* (2013.01); *H04L 41/0896* (2013.01)

(58) Field of Classification Search
CPC ..... H04L 41/0896; H04L 45/22; H04L 47/72; H04L 49/253; H04L 12/6402;
(Continued)

(56) References Cited

U.S. PATENT DOCUMENTS 8,666,247 B2 3/2014 Srinivasan et al.
8,682,160 B2 3/2014 Prakash et al.
(Continued)

OTHER PUBLICATIONS

"Process1." Collins English Dictionary, edited by Collins Dictionaries, 12th edition, 2014. Credo Reference, https://search.credoreference.com/content/entry/hcengdict/process1/0?institutionId=743. Accessed Dec. 4, 2017.*

(Continued)

*Primary Examiner* — David C Payne
*Assistant Examiner* — Tanya T Motsinger
(74) *Attorney, Agent, or Firm* — Clements Bernard Walker PLLC; Christopher L. Bernard; Lawrence A. Baratta, Jr.

(57) ABSTRACT

A method, implemented in a hybrid network element supporting switching at a plurality of layers, for multilayer resource management between the plurality of layers, includes operating a control plane at Layer N between a plurality of network elements in a network, wherein control plane signaling at the Layer N is processed at each network element in a path for a service in the network; and operating a resource management protocol at Layer N+1 with another network element in the network by injecting and extracting messages from and to the control plane into a data path in the Layer N+1, wherein a service at the Layer N+1 operates over the Layer N, and wherein the resource management protocol messages are processed at an originating network element and a terminating network element and not at intermediate network elements in the path.

18 Claims, 11 Drawing Sheets

(51) Int. Cl.
*H04Q 11/00* (2006.01)
*H04L 29/08* (2006.01)
*H04L 12/24* (2006.01)

(58) Field of Classification Search
CPC ....... H04L 45/04; H04J 14/0257; H04J 14/02; H04J 14/0206; H04J 14/0217; H04J 14/0258; H04J 14/0267; H04J 2203/0051; H04J 2203/0067; H04B 10/0795; H04B 10/572
See application file for complete search history.

(56) References Cited

U.S. PATENT DOCUMENTS

| | | | |
|---|---|---|---|
| 8,854,955 B2 | 10/2014 | Prakash et al. | |
| 9,800,325 B1* | 10/2017 | Skalecki | H04B 10/03 |
| 9,800,522 B2* | 10/2017 | Chhillar | H04L 47/72 |
| 9,819,565 B2* | 11/2017 | Djukic | H04L 43/0876 |
| 9,838,296 B2* | 12/2017 | Armolavicius | H04L 45/02 |
| 2002/0018269 A1* | 2/2002 | Chaudhuri | H04J 14/0227 398/166 |
| 2002/0030864 A1* | 3/2002 | Chaudhuri | H04J 14/0227 398/5 |
| 2008/0049769 A1* | 2/2008 | Bugenhagen | H04L 41/147 370/401 |
| 2009/0304380 A1* | 12/2009 | Sadananda | H04Q 11/0062 398/26 |
| 2011/0013908 A1* | 1/2011 | Gazzola | H04L 41/12 398/48 |
| 2013/0177305 A1 | 7/2013 | Prakash et al. | |
| 2013/0236169 A1* | 9/2013 | Gaudette | H04B 10/0793 398/25 |
| 2013/0259465 A1* | 10/2013 | Blair | H04B 10/27 398/2 |
| 2013/0272693 A1* | 10/2013 | Zhang | H04J 14/0212 398/5 |
| 2013/0308943 A1* | 11/2013 | Young | H04B 10/27 398/45 |
| 2013/0308948 A1* | 11/2013 | Swinkels | H04B 10/27 398/66 |
| 2014/0099119 A1* | 4/2014 | Wei | H04J 14/0257 398/79 |
| 2014/0126899 A1* | 5/2014 | Prakash | H04B 10/032 398/5 |
| 2015/0029846 A1* | 1/2015 | Liou | H04L 47/122 370/230.1 |
| 2015/0117850 A1* | 4/2015 | Prakash | H04B 10/032 398/2 |
| 2015/0181317 A1* | 6/2015 | Yin | H04Q 11/0062 398/45 |
| 2015/0207677 A1* | 7/2015 | Choudhury | H04L 41/0806 370/254 |
| 2015/0207724 A1* | 7/2015 | Choudhury | H04L 41/12 370/255 |
| 2015/0244470 A1* | 8/2015 | Chhillar | H04B 10/70 398/5 |
| 2015/0333824 A1* | 11/2015 | Swinkels | H04J 14/0227 398/25 |
| 2015/0365189 A1* | 12/2015 | Prakash | H04J 14/0227 398/34 |
| 2016/0028586 A1* | 1/2016 | Blair | H04B 10/27 398/45 |
| 2016/0057061 A1* | 2/2016 | Avci | H04L 47/125 370/235 |
| 2016/0105380 A1* | 4/2016 | Chhillar | H04L 47/72 370/244 |
| 2016/0182329 A1* | 6/2016 | Armolavicius | H04L 45/02 370/230 |
| 2016/0182344 A1* | 6/2016 | Subhedar | H04L 1/24 370/241.1 |
| 2016/0191194 A1* | 6/2016 | Wood | H04J 14/0286 14/286 |
| 2016/0218917 A1* | 7/2016 | Zhang | H04L 49/35 |
| 2016/0337171 A1* | 11/2016 | Ashwood-Smith | H04L 41/12 |
| 2016/0373205 A1* | 12/2016 | Gopalan | H04L 49/35 |
| 2017/0201323 A1* | 7/2017 | Prakash | H04Q 11/0001 |
| 2018/0007147 A1* | 1/2018 | Sareen | H04L 41/0893 |

OTHER PUBLICATIONS

Telecommunication Standardization Sector of ITU; ITU-T G.8080/Y.1304; Series G: Transmission Systems and Media, Digital Systems and Networks; Packet over Transport aspects—Ethernet over Transport aspects; Series Y: Global Information Infrastructure, Internet Protocol Aspects and Next-Generation Networks Internet protocol aspects—Transport; Feb. 2012.
E. Mannie; Network Working Group; Generalized Multi-Protocol Label Switching (GMPLS) Architecture; The Internet Society (2004); pp. 1-69; Oct. 2004.
Open Networking Foundation; OpenFlow Switch Specification Version 1.5.1 ( Protocol version 0x06 ); ONF TS-025; Mar. 26, 2015.
A. Doria et al., Network Working Group; General Switch Management Protocol (GSMP) Applicability; The Internet Society (2002); pp. 1-9; Jun. 2002.
A. Doria et al., Internet Engineering Task Force (IETF); Forwarding and Control Element Separation (ForCES) Protocol Specification; Internet Standards Track document; pp. 1-124; Mar. 2010.

* cited by examiner

MULTILAYER RESOURCE MANAGEMENT AND ARBITRATION IN TRANSPORT NETWORKS

CROSS-REFERENCE TO RELATED APPLICATION(S)

The present patent application/patent claims the benefit of priority of Indian Patent Application No. 201611000731, filed on Jan. 8, 2016, and entitled "MULTILAYER RESOURCE MANAGEMENT AND ARBITRATION IN TRANSPORT NETWORKS," the contents of which are incorporated in full by reference herein.

FIELD OF THE DISCLOSURE

The present disclosure generally relates to networking systems and methods. More particularly, the present disclosure relates to multilayer resource management and arbitration in transport networks.

BACKGROUND OF THE DISCLOSURE

Optical networks and the like (e.g., Dense Wave Division Multiplexing (DWDM), Synchronous Optical Network (SONET), Synchronous Digital Hierarchy (SDH), Optical Transport Network (OTN), Ethernet, and the like) at various layers are deploying control plane systems and methods. Control planes provide an automatic allocation of network resources in an end-to-end manner. Exemplary control planes may include Automatically Switched Optical Network (ASON) as defined in ITU-T G.8080/Y.1304, Architecture for the automatically switched optical network (ASON) (February 2012), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to Private Network-to-Network Interface (PNNI) and Multi-Protocol Label Switching (MPLS); or any other type control plane for controlling network elements at multiple layers, and establishing connections among nodes. Control planes are configured to establish end-to-end signaled connections such as Subnetwork Connections (SNCs) in ASON or OSRP and Label Switched Paths (LSPs) in GMPLS and MPLS. Note, as described herein, SNCs and LSPs can generally be referred to as services in the control plane. Also, note the aforementioned control planes are circuit-based control planes, e.g., operating at Layer 1(Time Division Multiplexing (TDM)) and/or Layer 0(wavelengths). Control planes use the available paths to route the services and program the underlying hardware accordingly.

In addition to control planes which are distributed, a centralized method of control exists with Software Defined Networking (SDN) which utilizes a centralized controller. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). Examples of SDN include OpenFlow (www.opennetworking.org), General Switch Management Protocol (GSMP) defined in RFC 3294 (June 2002), and Forwarding and Control Element Separation (ForCES) defined in RFC 5810 (March 2010), the contents of all are incorporated by reference herein. Note, distributed control planes can be used in conjunction with centralized controllers in a hybrid deployment.

Networks are multi-layered in nature, such as abstracted by the Open Systems Interconnection model of Layers 1 through 7 (L1 -L7). For descriptions herein, an additional Layer 0 is described as the physical photonic/Dense Wavelength Division Multiplexing (DWDM) network, whereas Layer 1 is used for Optical Transport Network (OTN) or other Time Division Multiplexing (TDM) protocols, Layer 2 is used for packet transmission, and the like. For example, with optical networks, a circuit switching layer (L1) (e.g., OTN, Synchronous Optical Network (SONET), etc.) relies on underlying DWDM (L0) with various Reconfigurable Optical Add/Drop Multiplexers (ROADMs). Above the circuit switching layer, packet connectivity such as Ethernet, Internet Protocol (IP), etc. can add to the network hierarchy, e.g., L2 +. In this hierarchy, a server layer is typically responsible for physical connectivity, and a client layer is responsible for fast reroutes, flow control, Quality of Service (QoS), etc.

Packet-Optical Transport Systems (POTS) enable multilayer support of network services. A hybrid service can operate simultaneously at multiple layers, and an exemplary hybrid service can include Ethernet over OTN (as well as over DWDM). In control plane and SDN communications, conventionally, signaling is sent between nodes to an end node which then forwards the signaling through all intermediate nodes towards a destination node. The signaling messages are sent at a single layer, and in the case of transport networks such as with OTN, via OTN signaling through the General Communications Channel (GCC). Conventionally, the OTN layer can establish communications with another OTN node in a network traversing multiple nodes, such as Reconfigurable Optical Add/Drop Multiplexer (ROADM) nodes, using control plane signaling. However, a similar function does not exist in a hybrid Packet and OTN network since control plane signaling will always be terminated on each hop and the L2 control Protocol Data Units (PDUs) can only be generated by a packet control layer. Thus, disadvantageously, for hybrid services, each intermediate node processes and forwards control plane messages, even if the messages were not meant for the intermediate node as may be the case for control plane messages related to Ethernet. That is, conventionally, control planes run on each network element along a path with the specialized handling of control plane messages. There is a need to adapt conventional, multilayer networks to better support hybrid services, such as via POTS or the like.

BRIEF SUMMARY OF THE DISCLOSURE

In an exemplary embodiment, a method, implemented in a hybrid network element supporting switching at a plurality of layers, for multilayer resource management between the plurality of layers includes operating a control plane at Layer N between a plurality of network elements in a network, wherein control plane signaling at the Layer N is processed at each network element in a path for a service in the network; and operating a resource management protocol at Layer N+1 with another network element in the network by injecting and extracting messages from and to the control plane into a data path in the Layer N+1, wherein the service at the Layer N+1 operates over the Layer N, and wherein the resource management protocol messages are processed at an originating network element and a terminating network element and not at intermediate network elements in the path. The control plane for the Layer N can be configured to cause the injecting and extracting of the messages in the data path at the Layer N+1. The hybrid network element can be a Packet-Optical Transport System supporting both Layer 1 switching and Layer 2 switching. The Layer N can be Time Division Multiplexing (TDM) data and the Layer N+1 can be packet data. The Layer N can be Optical Transport Network (OTN) data and the Layer N+1 can be packet data. Intermediate network elements in the path between the network element and the another network element do not operate the resource management protocol for the service but do operate the control plane.

The method can further include utilizing the resource management protocol to create, maintain, and exchange information about logical ports at the Layer N+1 for the service during any of mesh restoration or other user triggered operations including Make Before Break to activate, deactivate, switch traffic to and from the logical ports. The method can further include utilizing the resource management protocol to create and maintain protection resources for the service at the Layer N+1 for backup Layer N+1 endpoints that are reserved and restored with similar efficiency as the Layer N. The resource management protocol can exchange the messages with the another node regardless of a control plane state at intermediate nodes in the path.

In another exemplary embodiment, a hybrid network element supporting switching at a plurality of layers, adapted to provide multilayer resource management between the plurality of layers, includes one or more ports; and a controller communicatively coupled to the one or more ports and configured to operate a control plane at Layer N between a plurality of network elements over the one or more ports in a network, wherein control plane signaling at the Layer N is processed at each network element in a path for a service in the network, and operate a resource management protocol at Layer N+1 with another network element in the network by injection and extraction of messages from and to the control plane into a data path in the Layer N+1, wherein the service at the Layer N+1 operates over the Layer N, and wherein the resource management protocol messages are processed at an originating network element and a terminating network element and not at intermediate network elements in the path. The control plane for the Layer N can be configured to cause the injection and extraction of the messages in the data path at the Layer N+1. The hybrid network element can be a Packet-Optical Transport System supporting both Layer 1 switching and Layer 2 switching.

The Layer N can be Time Division Multiplexing (TDM) data and the Layer N+1 can be packet data. The Layer N can be Optical Transport Network (OTN) data and the Layer N+1 can be packet data. Intermediate network elements in the path between the network element and the another network element do not operate the resource management protocol for the service but do operate the control plane. The controller can be further configured to utilize the resource management protocol to create, maintain, and exchange information about logical ports at the Layer N+1 for the service during any of mesh restoration or other user triggered operations including Make Before Break to activate, deactivate, switch traffic to and from the logical ports. The controller can be further configured utilize the resource management protocol to create and maintain protection resources for the service at the Layer N+1 for backup Layer N+1 endpoints that are reserved and restored with similar efficiency as the Layer N. The resource management protocol exchanges the messages with the another node regardless of a control plane state at intermediate nodes in the path.

In a further exemplary embodiment, a multilayer network includes a plurality of interconnect network elements including at least two hybrid network elements; wherein the plurality of network elements operates a control plane at Layer N, wherein control plane signaling at the Layer N is processed at each network element in a path for a service in the network; and wherein the at least two hybrid network elements operate a resource management protocol at Layer N+1 with one another by injection and extraction of messages from and to the control plane into a data path in the Layer N+1, wherein the service at the Layer N+1 operates over the Layer N, and wherein the resource management protocol messages are processed at an originating network element and a terminating network element and not at intermediate network elements in the path. The control plane for the Layer N can be configured to cause the injection and extraction of the messages in the data path at the Layer N+1.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to multi-layer resource management and arbitration in transport networks. Specifically, the present disclosure provides systems and methods for configuration of hybrid services in a multilayer network, using control planes, SDN, and a combination thereof. Again, hybrid services are those that span multiple layers but are controlled and managed as a single service. A particular hybrid service of interest is packet over OTN and the efficient configuration of hybrid packet and OTN switches. Variously, the systems and methods enable efficient configuration, operation, and management of hybrid packet and OTN services using control planes, SDN, and a combination thereof. The systems and methods target resource management at edge nodes (i.e., hybrid nodes or POTS) for Network-Network Interface (NNI) interfaces and require the OTN layer to make informed decisions based on client layer resource availability as well as OTN layer bandwidth information. This is required to achieve dynamic packet tunnels which will respond to failures in the network such as with Link Aggregation Groups (LAGs). The systems and methods build a communication mechanism to achieve this integration for L2 and OTN nodes, which does not exist today.

In various exemplary embodiments, Layer 2 logical ports are created/maintained at originating and terminating nodes by a L1 control plane based on a calculated reserved tunnel at originating node. Note, the originating node can also be a source node and the terminating node can also be a destination node. The systems and methods use an in-band protocol using Layer 2 control PDUs to establish/maintain backup logical ports at the terminating nodes. The in-band communication mechanism builds an integrated server and client layer control plane and fabric functions residing on the same node (co-located) for POTS, such as edge nodes for multilayer resource management (OTN and Packet resources) functions for NNI interfaces. In an exemplary embodiment, the server layer can be OTN and the client layer can be packet. Server layer control PDUs are sent with the client data path, without a requirement for a client/server layer control plane running across the whole route except for the edge nodes. Server layer control PDUs are sent with the client data path, without a requirement for any separate out-of-band setup or Open Shortest Path First (OSPF)/Internet Protocol (IP) based routing. The proposed mechanism can integrate client layer resource management functions with server layer decisions for pre-allocation/reservation of client and server layer NNI and fabric resources. The server layer can perform informed/intelligent oversubscription to allow for shared protection and optimized capacity installation.

Figure 1:
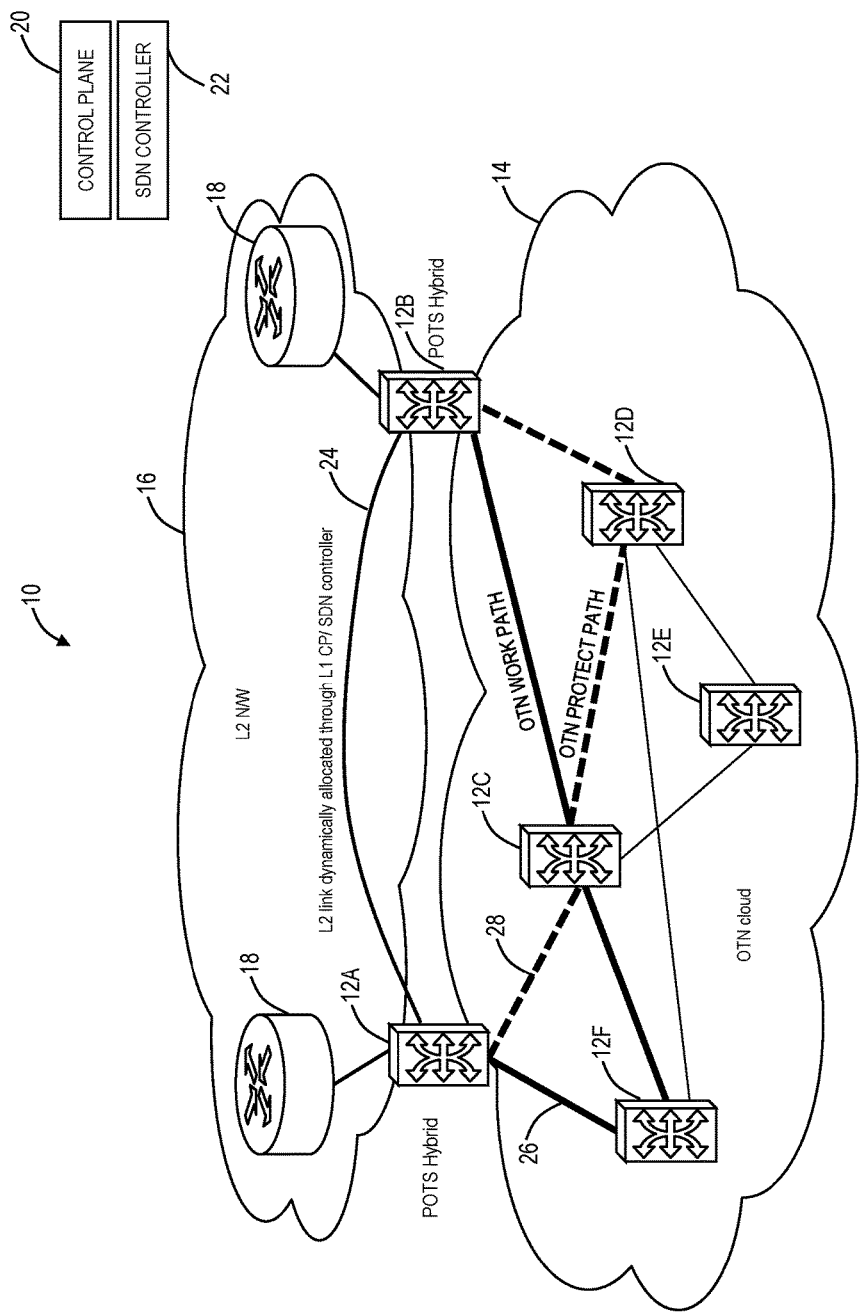
FIG. 1 is a network diagram of an exemplary network with various interconnected network elements providing OTN connectivity in an OTN cloud and packet connectivity in a packet cloud.

Referring to FIG. 1, in an exemplary embodiment, a network diagram illustrates an exemplary network 10 with various interconnected network elements 12 providing OTN connectivity in an OTN cloud 14 and packet connectivity in a packet cloud 16. The network elements 12 include network elements 12A-12F forming the OTN cloud 14. The packet cloud 16 includes the network elements 12A, 12B, which are POTS or the like, i.e., network elements supporting both OTN and packet connectivity, along with switches 18. The network elements 12C-12F may or may not include POTS or equivalent functionality. The network 10 includes a control plane 20 operating on/between the network elements 12 and/or an SDN controller 22 communicatively coupled to the network elements 12.

Again, conventionally, a network element 12 performs switching using only one technology (e.g., TDM like SDH, OTN, etc.). For a multiservice, multilayer switch, such as the network elements 12A, 12B, the non-native switching (e.g., packet switching) is performed on a blade and all traffic that passes between cards within that shelf is done using the native technology (e.g., SDH, OTN). In an exemplary embodiment, the network elements 12A, 12B, as POTS or the like, perform native switching at the OTN layer for the OTN cloud 14 and non-native switching at the packet layer for the packet cloud 16. The terminology native and non-native can also be viewed as server (i.e., native or OTN) and client (i.e., non-native or packet) layers. POTS are evolving to support true hybrid switching fabrics, and there is a choice made when passing traffic between cards: treated as OTN or treated as packet. Obviously, not all traffic can be treated arbitrarily. However, in the case of packet traffic, it may be advantageous to treat the inter-card traffic as either packet or OTN.

For true hybrid switching fabrics, there are three distinct techniques for moving packet traffic across a hybrid packet+TDM infrastructure. The first variant is to take packet traffic on an ingress card, adapt it to the TDM infrastructure, transfer it across the fabric as a TDM frame and then perform TDM multiplexing for transmission off the shelf. The second variant takes the packet traffic on the ingress card, adapt it to the TDM infrastructure, transfers it across the fabric as a TDM frame, converts it back into a packet flow, packet switches it with other packet flows, sends it out an egress interface, adapted to a TDM infrastructure and then multiplexes it onto a TDM line for transmission off the shelf. There are a lot more steps for the second implementation but it has the advantage in that aggregation of the packet flows is performed on the egress interface which allows for statistical multiplexing of the packet traffic into a single OTN container that can be OTN switched on its way to the final destination node. Advantageously, the OTN container is only subject to congestion management at the originating and terminating nodes. If the packet traffic was treated as a pure packet flow (switching or routing alone), then the packet traffic transiting the intermediate nodes would be subject to congestion management practices at the intermediate nodes.

The third variant is to take the packet traffic on the ingress card, transfer it across the fabric as packet traffic, packet switch it with other packet flows (generally as a function of virtual output queuing on the egress card), adapt it to a TDM infrastructure and then multiplex it onto a TDM line for transmission off the shelf. Comparing the third variant this to the second variant, the advantages of packet multiplexing are maintained, but the number of steps involved is reduced.

Configuring OTN traffic including adaptation, termination and switching is performed quickly. It can be performed by a management or control plane including the control plane 20 and/or the SDN controller 22, and the reconfiguration of such is very efficient. Also, the necessary resources associated with OTN traffic are deterministic and well understood. Configuring packet traffic including the adaptation, termination, and switching can also be performed quickly. However, with many packet control protocols, additional learning may occur with the packet traffic (e.g., Media Access Control (MAC) learning for an Ethernet switch). When an Ethernet switch is reconfigured, the process of MAC learning must begin anew. Curiously, the resources that a packet switch consumes on the ingress and egress card can vary with the type of packet traffic and number of end stations on either side of the packet switch. For this reason, the actual number resources consumed is not deterministic for packet traffic.

What is desired are all the benefits of rapid OTN reconfiguration but for packet traffic. The systems and methods are concerned with the coordinated reconfiguration of alternate packet switching endpoint members (a.k.a., a virtual switch logical port) so that in the event of a member of failure, an alternate packet switching endpoint member may be rapidly configured for immediate use without additional packet endpoint configuration or control protocol learning required. It is important to note that this needs to be coordinated between the source switch and the destination switch. In the case of a chassis-based hybrid packet OTN switch, it is desirable that active and standby switching endpoint members reside on different line modules. It is also important to understand that the traffic on these hybrid line modules may not be symmetrical, and hence the packet resources consumed will vary from line module to line module.

The systems and methods include the L1 control plane 20 (or the SDN controller 22) making intelligent/informed decisions for setting up backup tunnels for packet traffic over the TDM infrastructure, i.e., the OTN cloud 14. The originating and terminating network element will coordinate using an in-band protocol described herein as a Link Aggregation Management Protocol (LAMP) and configuring a backup L2 logical port based on the L1 tunnel(path). As backup L2 endpoints are reserved, in the case of failure traffic, restoration will be with OTN efficiency. Specifically, in FIG. 1, the originating network element can be the network element 12A and the terminating network element can be the network element 12B. A packet link 24 is configured between the network elements 12A, 12B through the OTN cloud 14. Specifically, the OTN cloud 14 include a work path 26 and a protect path 28. The network elements 12A, 12B participate in the control plane 20 and/or communicate with the SDN controller 22, as well as implement the in-band protocol, LAMP.

The in-band protocol enables setup of alternate logical ports at the network elements 12A, 12B at Layer 2 to setup the backup tunnel with Layer 1 restoration efficiencies. The L1 control plane 20 can use the L2 management bytes to exchange control messages that are meant only for end nodes, the network elements 12A, 12B. These L1 messages in L2 control PDUs will exchange messages to trigger creation/deletion of Layer 2 backup logical ports for the backup tunnel.

The OTN layer is used to install capacity for L2 services for point and click end-to-end L2 service provisioning; only the network elements 12A, 12B (i.e., the edge switches) need to support packet switching; higher link availability is provided via Mesh Restorable redundant legs in the OTN cloud 14; hitless dynamic link capacity via independent resizable legs based on Optical channel Data Unit-Flex (ODUFlex); and protection leg path diversity. The control plane 20 is used to install Mesh Restorable and Resizable capacity trunks for L2 services. The L2 LAG concept allows for aggregation of physical OTN connections into logical trunks for either resiliency or load sharing. The OTN connections which are members of the parent LAG are dynamic in nature and not fixed physical trunks, both active or protect members are allowed to be independently mesh restored or flex resized by the control plane 20. The L2 LAG members can always be Shared Risk Link Group (SRLG) diverse at OTN layer.

The systems and methods can insert control plane messages of layer N in layer N+1 management bytes. The control plane messages will be transported in-band to the terminating network element 12B, where Layer N+1 will extract the control PDUs and pass them back to layer N. Here these PDUs follow the data path of the client layer (N+1). These PDUs are assigned a default priority same as other control PDUs of client layer protocols like Link Aggregation Control Protocol (LACP). In an exemplary embodiment, Layer N is OTN and Layer N+1 is packet. Additionally, SDN controller based multilayer orchestration can achieve integrating Packet over OTN reservation model based on the abovementioned lines and protocol.

Figure 2:
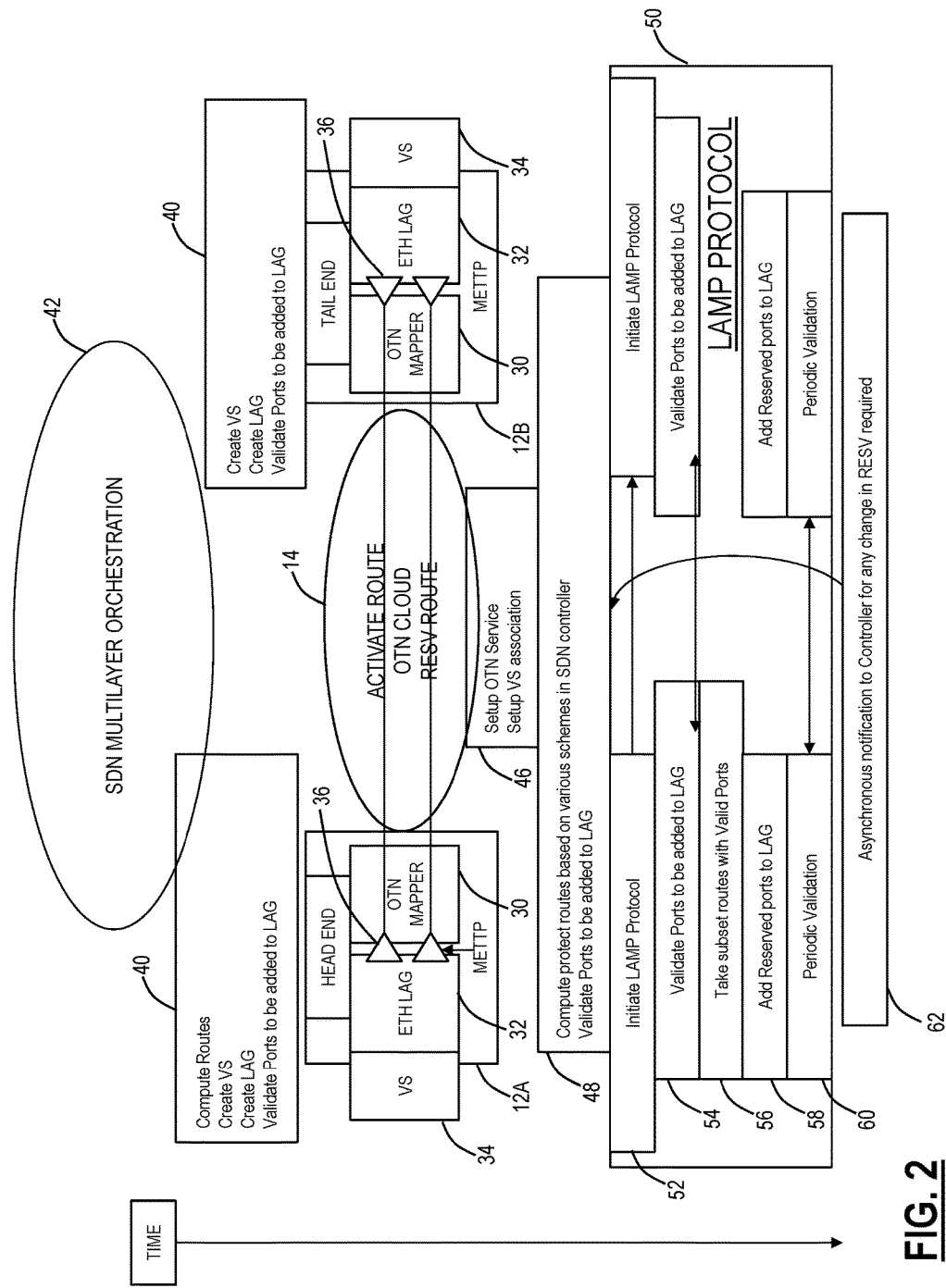
FIG. 2 is a flow diagram of L1 and L2 service setup between the Packet-Optical Transport System (POTS) network elements of the network of FIG. 1.

Referring to FIG. 2, in an exemplary embodiment, a flow diagram illustrates L1 and L2 service setup between the network elements 12A, 12B. The flow diagram shows time along a vertical axis and the flow diagram describes an exemplary sequence of L2 and L1 service setup and protection reservation in both L2 and L1, using the control plane 20, optionally the SDN controller 22, and the in-band protocol. The network elements 12A, 12B include an OTN mapper 30, an Ethernet LAG 32, and a virtual switch (VS) 34. The OTN mapper 30 include circuitry performing TDM multiplexing, i.e., OTN. The VS 34 is a L2 packet switch that is virtualized to provide a partitioned switch on a physical switch. The Ethernet LAG 32 provides a LAG to/from the V4 34, and the network elements 12A, 12B include Ethernet Trail Termination Points (ETTP) 36 between the OTN mapper 30 and the Ethernet LAG 32.

The service setup includes an OTN layer tunnel setup and, in turn, establish a L2 data path (step 40). This includes computing a route at L1 and optionally at L0 (DWDM), which can be performed by the originating network element 12A as the source node in the control plane 20. Alternatively, the route can be computed by the SDN controller 22 through multilayer orchestration 42. Step 40 can also include creating the VS 34 at the network elements 12A, 12B, creating the Ethernet LAG 32, and validating the ports to be added to the Ethernet LAG 32. Subsequent to step 40, the route can be activated or reserved in the OTN cloud 14 including setting up the OTN service and the VS association (step 46).

The service setup includes the control plane 20 and/or SDN controller 22 computing K available NNI resources at L2 which could be connected to the peer L2 switch via L1 (i.e., the network element 12A performing the computation based on the resources between the network elements 12B). The control plane 20 can arbitrate on L2 resource validity at the network elements 12A, 12B. The protect routes can be computed in the SDN controller 22 based on various schemes as well as validating the ports to be added to the LAG 32 (step 48).

The service setup includes setting up multilayer communication through a resource management protocol 50, i.e., the in-band protocol. The resource management protocol 50 can include initiation (step 52), validating ports added to the LAG 32 (step 54), taking a subset of routes with valid ports (step 56), adding reserved ports to the LAG 32 (step 58), periodic validation (step 60), and asynchronous notifications to the controller 22 for any change in reservations (RESV) required (step 62). For the resource management protocol 50, control PDUs are exchanged between L2 peers, i.e., the network elements 12A, 12B. These messages are then terminated and sent down to OTN layer which is identified by a Service Access Point Identifier (SAPI)/Organizationally Unique Identifier (OUI) in L2. These control PDUs are controlled by the OTN control plane 20 based on OTN service provisioning. These messages allow for dynamic reservation/allocation of NNI resources at both the OTN and L2 layers, i.e., the OTN cloud 14 and the L2 cloud 16. The OTN control plane 22 can trigger resource allocation at L2 on arbitrated resources. The OTN control plane 22 can make informed decisions on either an asynchronous or periodic basis about the client layer resource availability and hence either reroute or redirect the protection tunnel reservation/allocation. L2 can be informed about potential reservation requests either on the line side interfaces or the fabric. This allows L2 to download required information to NNI hybrid cards and thus improve on redial performance.

Figure 3:
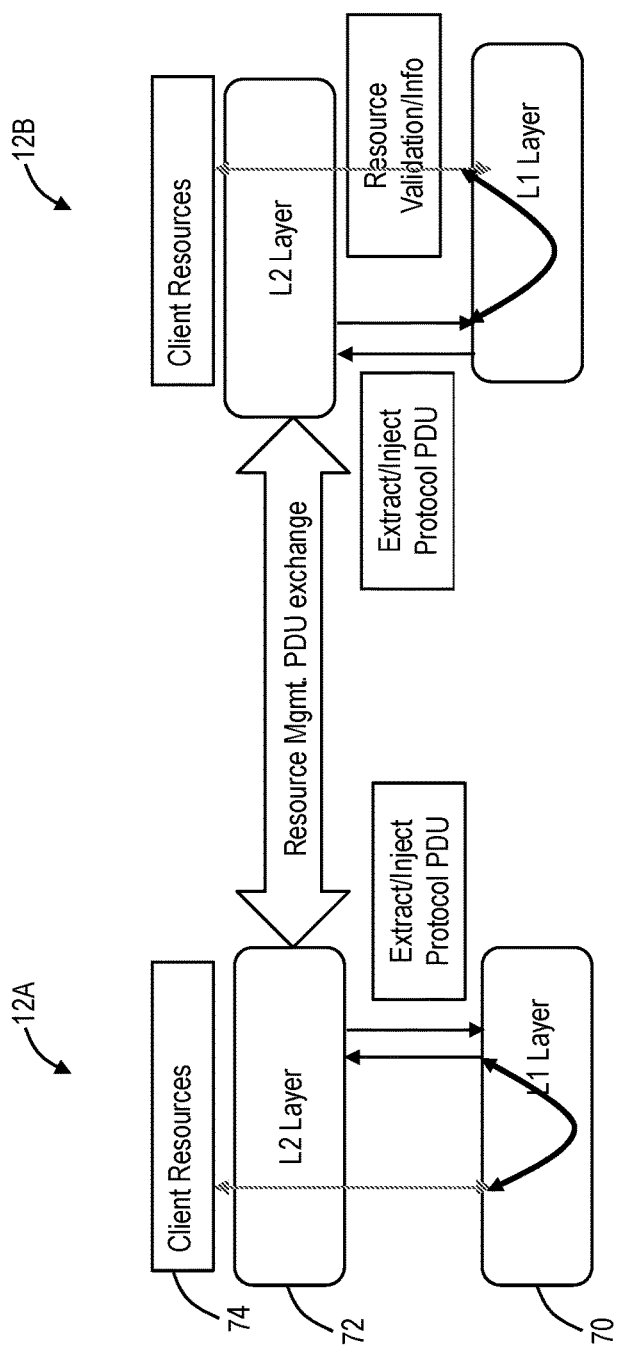
FIG. 3 is a functional block diagram of functionality at the network elements for the resource management protocol with the control plane/controller on hybrid services in the network of FIG. 1.

Referring to FIG. 3, in an exemplary embodiment, a functional block diagram illustrates functionality at the network elements 12A, 12B for the resource management protocol 50 with the control plane 20/controller 22 on hybrid services. Functionally, the network elements 12A, 12B include L1 switching resources 70, L2 switching resources 72, and client resources 74. The resource management protocol 50 utilizes Layer N+1 control plane PDUs for edge node communication in Layer N. Again, in an exemplary embodiment, Layer N+1 is Layer 2, and Layer N is Layer 1 such as OTN. Client layer resource management of the client resources 74 can be arbitrated by the server layer, i.e., the L1 switching resources 70. In operation, the resource management protocol 50 includes a resource management control PDU exchange at L2 between the network elements 12A, 12B via the L2 switching resources 72. The network elements 12A, 12B extract/inject the control PDU to provide resource validation/information to the L1 switching resources 70, for the control plane 20.

The server layer makes informed decisions for tunnel setup for the client layer based on client layer resource availability for protection reservation/allocation. The exchange of messages between the network elements 12A, 12B is possible even when the intermediate node control plane 20 is down (e.g., rebooting, etc.) because the messages are in Layer N+1 control PDUs which are embedded in Layer N payload, transparently passed between the network elements 12A, 12B. The intermediate nodes, e.g., the network elements 12C-12F, have no requirements to operate the resource management protocol 50 or to understand the control PDUs. For example, the intermediate nodes can be an older software release node or third party equipment. The resource management protocol 50 integrates client layer resource management functions with server layer decisions for pre-allocation/reservation of client and server layer NNI and fabric resources on the L1 switching resources. The proposed communication mechanism adapts to changes based on server or client layer faults or changes. The resource management protocol 50 allows for informed oversubscription so as to reduce the risk of pre-emption and crank back for connections during redials through the control plane 20. Even if any of the control planes 20 across the route gets rebooted (e.g., line modules or central modules), the communication channel end-to-end is not broken and is kept alive by the hybrid edge nodes, the network elements 12A, 12B.

Figure 4:
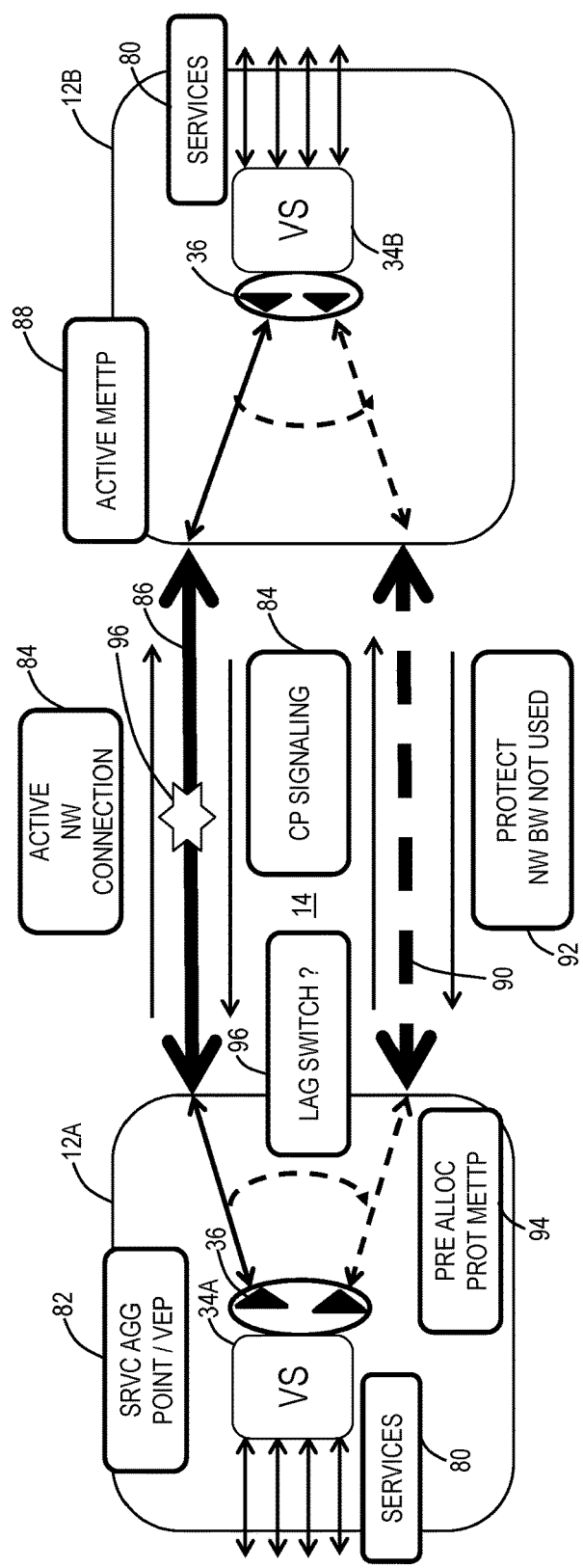
FIG. 4 is a network diagram of the network elements and associated functionality operating a hybrid service with the resource management protocol in the network of FIG. 1.

Referring to FIG. 4, in an exemplary embodiment, a network diagram illustrates the network elements 12A, 12B and associated functionality operating a hybrid service with the resource management protocol 50. Initially, services 80 are connected to the VSs 34A, 34B without connectivity in the OTN cloud 14. The VS 34A performs service aggregation of the services 80 at the network element 12A (step 82). The network element 12A performs control plane signaling with the network element 12B (step 84) to signal a new active network connection (step 86) for the services 80. The control plane signaling is used to establish a L1 connection 86 for the services 80 between the network elements 12A, 12B, e.g., the working path 26. The network elements 12A, 12B establish the ETTPs 36 for an active METTP (step 88). With the working path established on the L1 connection 86, control plane signaling is used to establish a L1 connection 90 for a protection path, e.g., the protection path 28. The L1 connection 90 is protection bandwidth that is not used (step 92). The resource management protocol 50 can be used to create protection ETTPs 36 that a pre-allocated protection ETTPs (step 94). For illustration purposes, a fault 96 can occur on the L1 connection 86, and a LAG switch can occur to the L1 connection 90 (step 98). The following table illustrates various entities between the network elements 12A, 12B for L2, L1, and L0:

| ENTITY | L2 | L1 | L0 |
| --- | --- | --- | --- |
| SRVC AGG POINT | LAG | ODUj | MC |
| NW CONNECTION | VEP = (1 + N ODUk/ODUFlex SNCs) | OTN SNC | L0 SNC |
| TERMINATION PT SERVICES | METTP xETH FLOWS | ODUk CTP xODUj | GMD xOCH |

Figure 5:
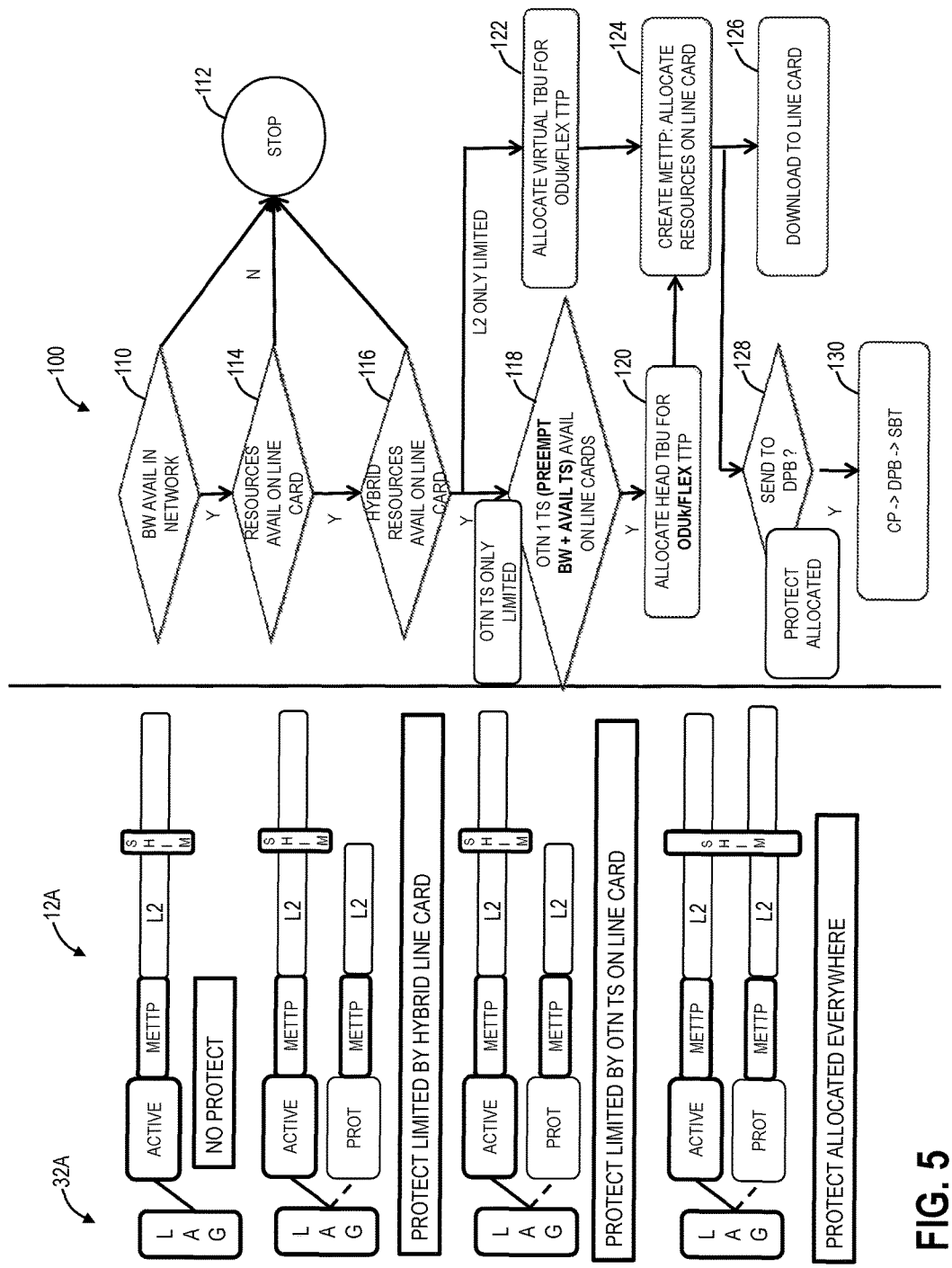
FIG. 5 is a flowchart of a process for establishing L1and L2resources for a hybrid service on the network element along with a block diagram of corresponding functionality in hardware on line cards in the network element.

Referring to FIG. 5, in an exemplary embodiment, a flowchart illustrates a process 100 for establishing L1 and L2 resources for a hybrid service on the network element 12A along with a block diagram of corresponding functionality 102 in hardware on line cards in the network element 12A. The process 100 includes checking available bandwidth in the network 100 (step 110), and if no bandwidth is available, the process 100 stops (step 112). If there is bandwidth available (step 110), the process 100 includes checking if resources are available on line cards (step 114), and if not, the process 100 stops (step 112). If there are resources available on the line card (step 114), the process 100 includes checking if hybrid resources are available on the line card (step 116), and if not, the process 100 stops (step 112).

If there are hybrid resources available on the line card (step 116), the process 100 either is OTN Timeslot (TS) only limited or L2 only limited, based on the resources. If the process is OTN TS only limited, the process 100 checks if one OTN TS (preemption bandwidth plus available TSs) is available on the line card (step 118). If there is, at least, one OTN TS available, the process 100 includes allocating a head Transport Bandwidth Unit (TBU) for an ODUk/ODUflex Trail Termination Point (TTP) (step 120). If the process 100 is L2 only limited, the process 100 include allocation a virtual TBU for the ODUk/ODUflex TTP (step 122). After the steps 120, 122, the process 100 includes creating a METTP allocating resources on the line card (step 124). The process includes downloading the associated information to the line card (step 126) and checking if the information should be downloaded to the DPB (step 128), and optionally sending the information to the DPB (step 130).

Correspondingly, the network element 12A functionality is shown. First, the LAG 32A is established with an active port, an METTP, L2 switching resources, and L1 switching resources, without protection. Next, the protection is limited by the hybrid line card where there is a protection port, METTP, and L2 switching resources, but no corresponding L1 switching resources. Next, the protection is limited by OTN TSs on the line card with a similar setup as above. Finally, the network element 12A has the active and protect ports fully allocated in L1 and L2.

The resource management protocol 50 is an OTN controlled Layer 2 Link Management protocol for protect links. The resource management protocol 50 can be referred to as LAMP and includes the following attributes. First, the resource management protocol 50 pushes an end-to-end set of control plane-LAG services as a Virtual Link to the control plane 20. This virtual link can be defined by the control plane-LAG at the two ends, i.e., the network elements 12A, 12B (network edges for OTN to L2 or vice-versa data plane transition) provisioned as part of the network services or capacity installation. The resource management protocol 50 can include configuration of N protection links, monitoring, and maintaining of N protect links, etc. (N being an integer). The resource management protocol can include unidirectional resource management for pre-emption scenarios (e.g., ADD/DEL/UPD-LOCAL/RMT), periodic heartbeat and horizontal sync messages over reboots and switchovers, etc. The resource management protocol 50 can control triggers for re-computation and re-provisioning of protect routes and provide periodic protect network route validation schemes.

Figure 6:
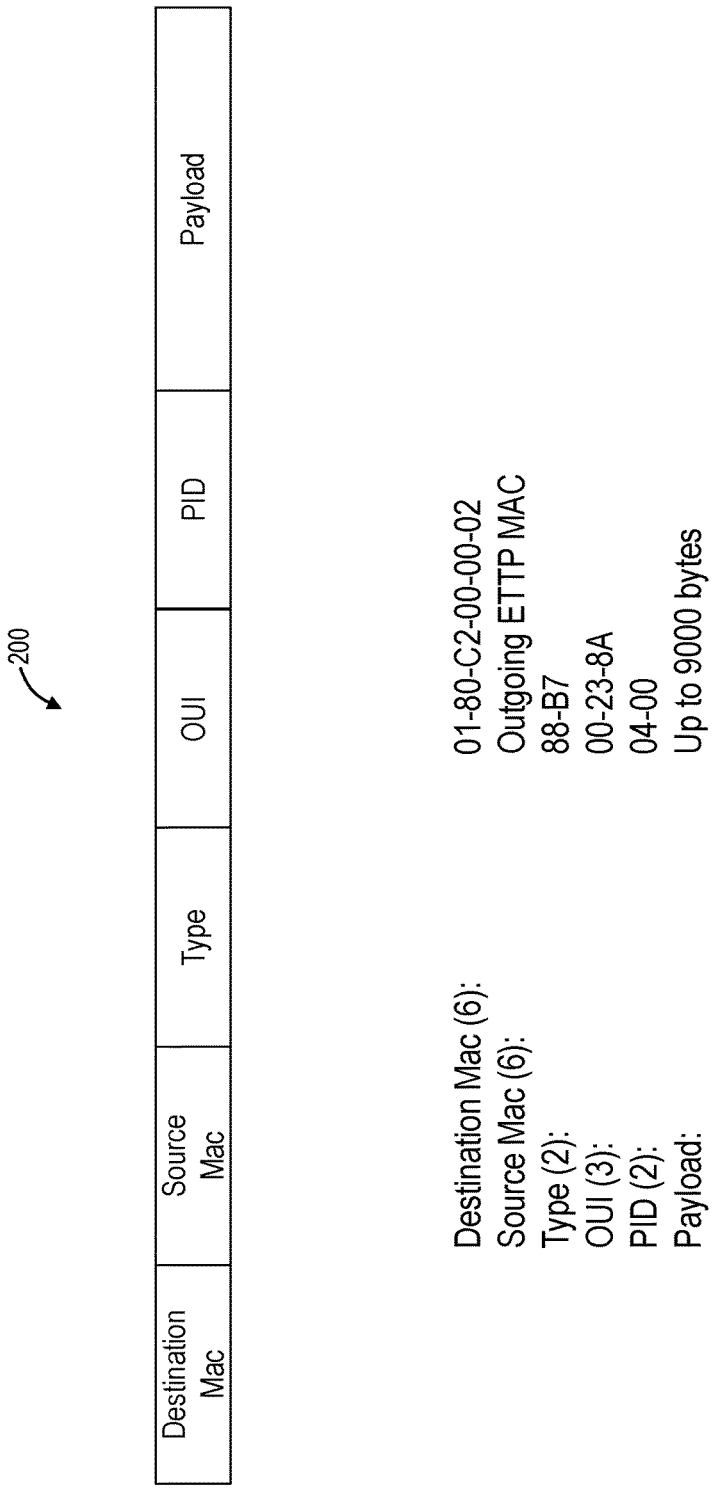
FIG. 6 is a block diagram of an exemplary packet header for a control PDU for the resource management protocol.

Referring to FIG. 6, in an exemplary embodiment, a block diagram illustrates an exemplary packet header 200 for a control PDU for the resource management protocol 50. The packet header 200 includes a Destination MAC, Source MAC, type, OUI, Protocol Identifier (PID), and payload. Also, FIG. 6 illustrates exemplary values for the packet header 200.

The following table illustrates exemplary command types for the resource management protocol 50:

| Command Name | Description |
| --- | --- |
| HELLO | Establish the LAMP virtual link between end to end ports |
| VALIDATE-PORT | Validate set of N protect ports (INTF ID) for L2 resources |
| ADD-PORT | Add one or more protect ports (METTP) to association Table. |
| DELETE-PORT | Delete one or more protect ports (METTP) from association Table. |
| ACK | Successful Response to Request followed by IEs if required |
| NACK | Failure Response followed by Error Code IE |

The following table illustrates exemplary attribute tag types for the resource management protocol 50:

| Information Element (IE) Name | Description |
| --- | --- |
| SRC-CP-LAG | Source CP-LAG AID |
| DST-CP-LAG | Destination CP-LAG AID |
| PROTECT-HOLDOFF-TMR | Timer duration (in seconds) to clean all protect associations when LAMP is DOWN |
| CONN-NAME | NW SNC AID |
| INTF-ID | OSRP Interface ID corresponding to protect path |
| ORIG-METTP | METTP AID referring to Port from Node where command was initiated |
| TERM-METTP | METTP AID referring to Port on which command is to be invoked |
| CONN-RATE | Rate of the METTP to be validated/allocated |
| ERROR-CODE | Error code for Response failures |

Figure 7:
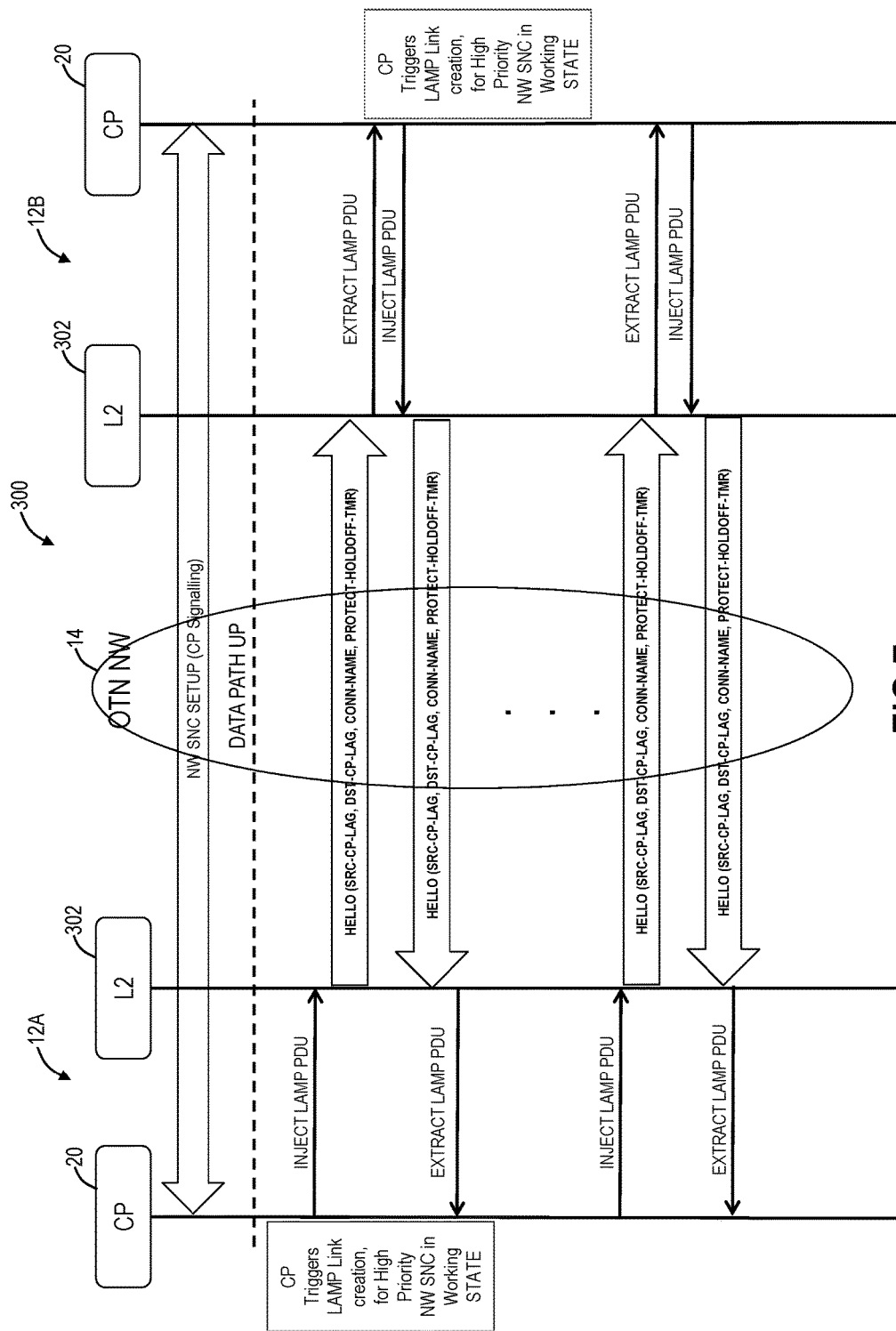
FIG. 7 is a flow diagram of LAMP session creation between the control plane and L2at the network elements over the OTN cloud in the network of FIG. 1.

Referring to FIG. 7, in an exemplary embodiment, a flow diagram illustrates LAMP session creation 300 between the control plane 20 and L2 302 at the network elements 12A, 12B over the OTN cloud 14. Specifically, the LAMP session creation 300 illustrates the interaction between the control plane 20, operating at L1, and the L2 switching resources 72, operating at L2. First, at L1, a Sub Network Connection (SNC) is setup in the network 10, through the OTN cloud 14, via control plane (CP) signaling. Note, the SNC could also be a Label Switched Path (LSP) or other service in the L1 control plane 20. Once the SNC is setup, the data path is up. The control plane 20 can trigger the LAMP (resource management protocol 50) link creation for a high priority network SNC in the working state by injecting, from the control plane 20, a LAMP control PDU in the L2 data path. The control PDU is received over the OTN cloud 14 at network element 12B, extracted by the L2 302 and provided to the control plane 20 at the network element 12B. The control planes 20 at the network elements 12A, 12B exchange HELLO messages and replies to create the resource management protocol 50 session.

Figure 8:
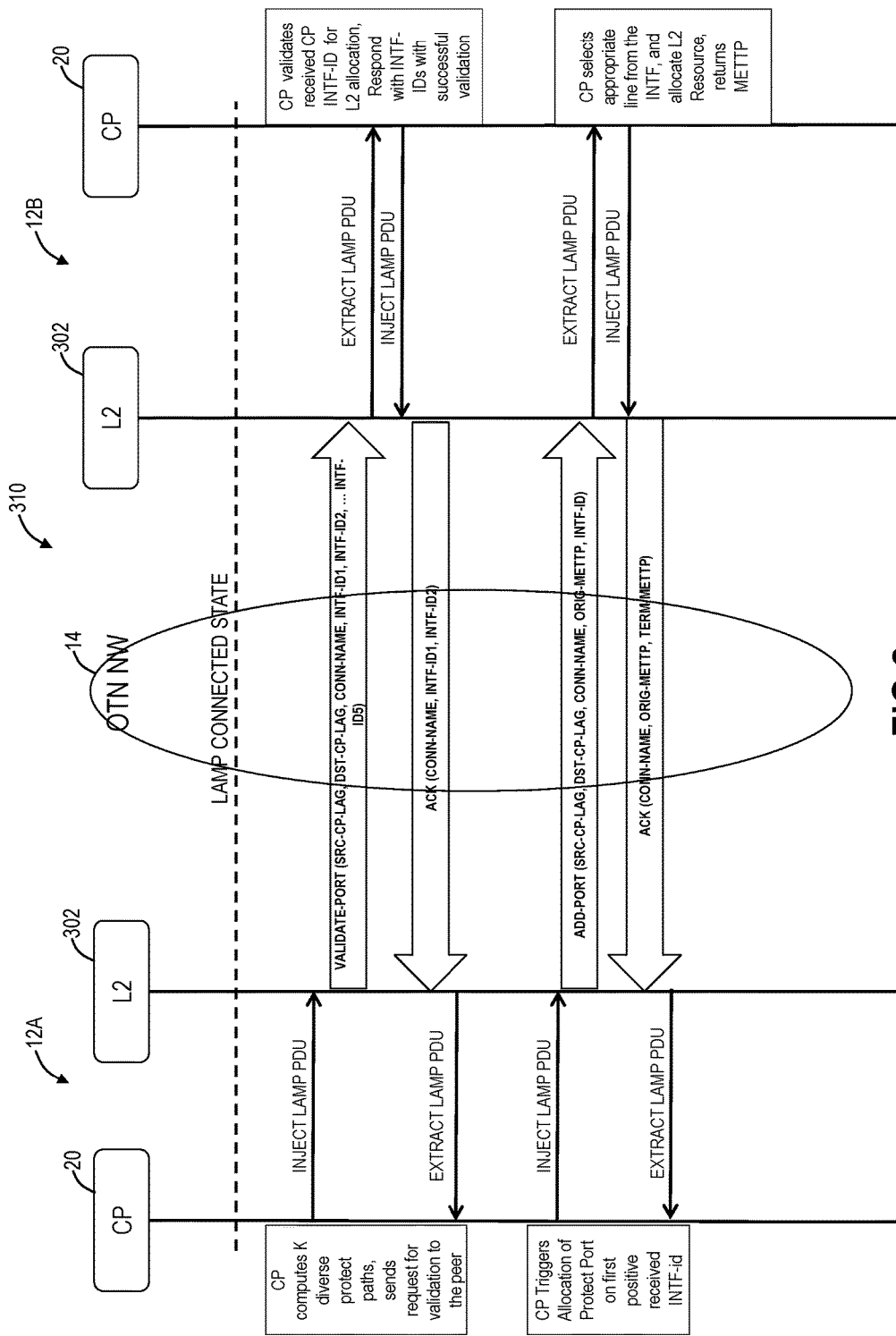
FIG. 8 is a flow diagram of LAMP protection allocation between the control plane 20 and L2 at the network elements over the OTN cloud in the network of FIG. 1.

Referring to FIG. 8, in an exemplary embodiment, a flow diagram illustrates LAMP protection allocation 310 between the control plane 20 and L2 302 at the network elements 12A, 12B over the OTN cloud 14. Again, similar to the session creation 300, the protection allocation 310 relies on L2 control PDUs injected by the control planes 20 at the network elements 12A, 12B at L2 that are then extracted at the opposing network element 12A, 12B. At the network element 12A, the control plane 20 computes K diverse protect paths and send a request for validation to the network element 12B (K being an integer). The network element 12B validates the received information for L2 allocation and responds to the network element 12B with successful validation. The network element 12A control plane 20 triggers allocation of protect paths based on the information based on the network element 12B. The network element 12B selects the appropriate line to allocate L2 resources for protection.

Figure 9:
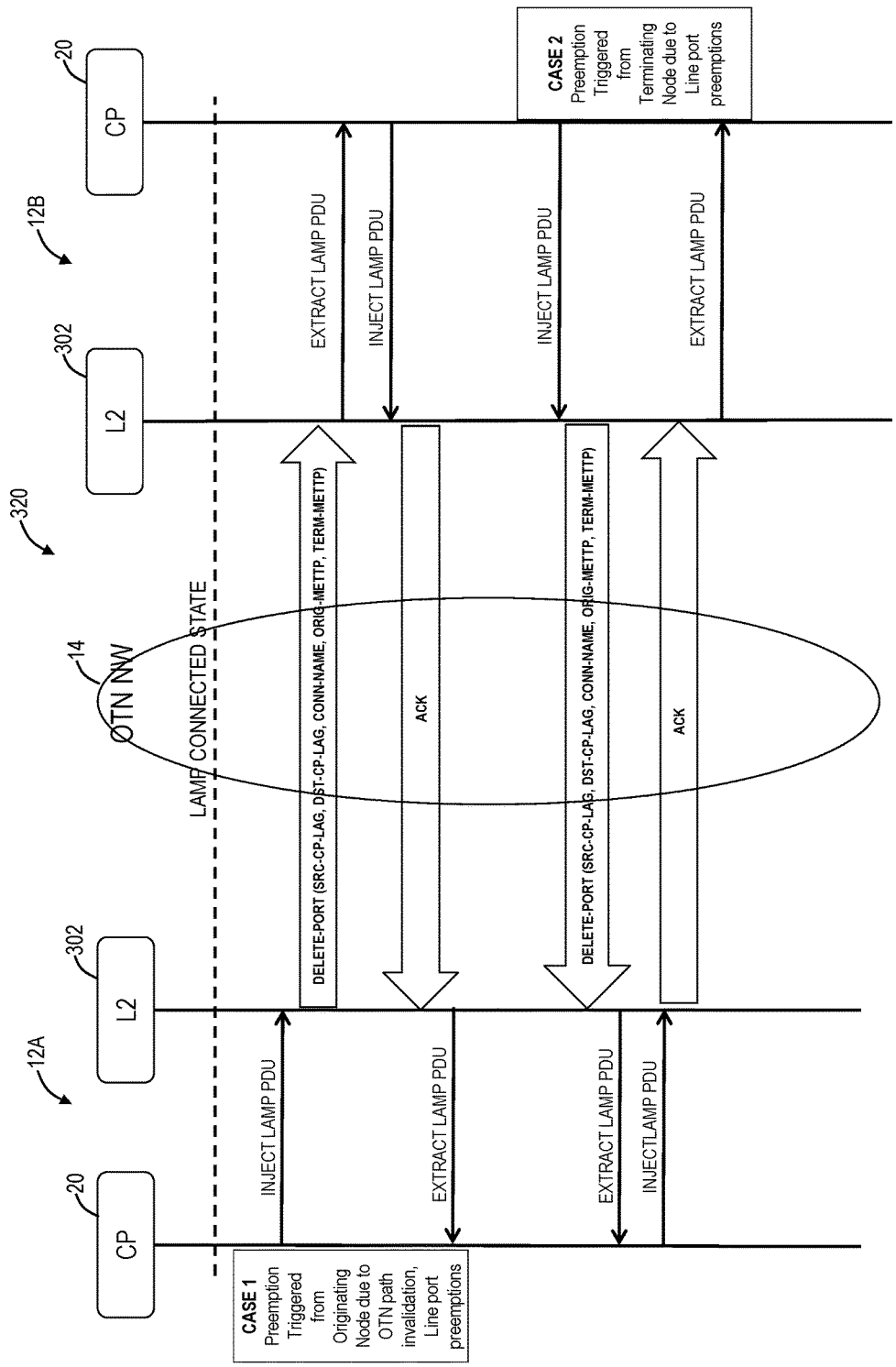
FIG. 9 is a flow diagram of LAMP preemption (protect de-allocation) between the control plane and L2at the network elements over the OTN cloud in the network of FIG. 1.

Referring to FIG. 9, in an exemplary embodiment, a flow diagram illustrates LAMP preemption 310 (protect de-allocation) between the control plane 20 and L2 302 at the network elements 12A, 12B over the OTN cloud 14. Again, similar to the session creation 300, the protection allocation 310 relies on L2 control PDUs injected by the control planes 20 at the network elements 12A, 12B at L2 that are then extracted at the opposing network element 12A, 12B. Two cases of preemption are described. First, preemption can be triggered from the originating node (the network element 12A) due to OTN path invalidation, line port preemptions, etc. Second, preemption can be triggered from the terminating node (the network element 12B) due to line port preemptions.

Note, L2 is agnostic to the LAMP protocol (the resource management protocol 50). Specifically, L2 transmits the payload as is, over any of the active ports of the provided LAG. L2 extracts the payload, at the network elements 12A, 12B, and passes it to the control plane 20 as it received on the port associated with the LAG.

Figure 10:
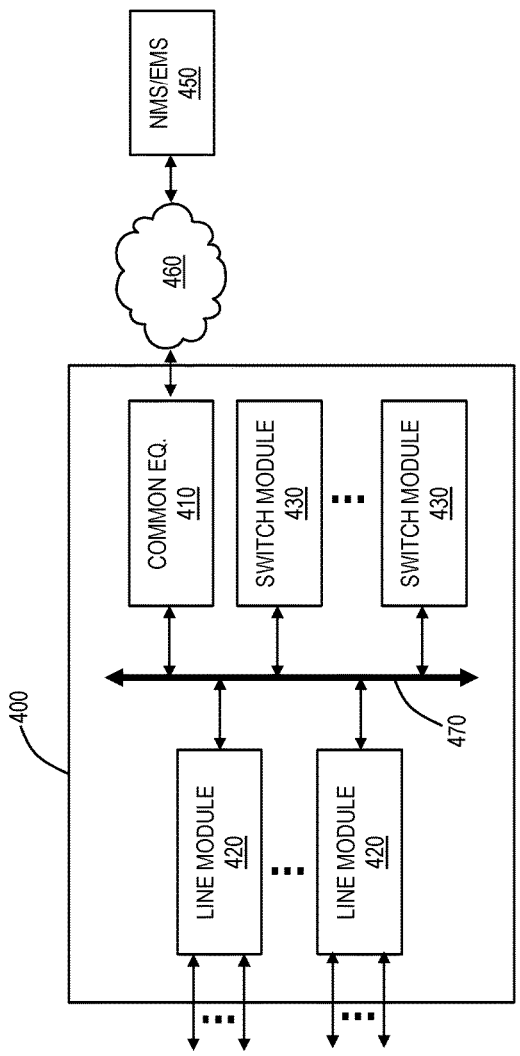
FIG. 10 is a block diagram of an exemplary node for use with the systems and methods described herein, specifically the POTS network elements in the network of FIG. 1.

Referring to FIG. 10, in an exemplary embodiment, a block diagram illustrates an exemplary node 400 for use with the systems and methods described herein, specifically the network elements 12A, 12B. In an exemplary embodiment, the exemplary node 400 can be a network element that may consolidate the functionality of a Multi-Service Provisioning Platform (MSPP), Digital Cross-Connect (DC S), Ethernet and/or Optical Transport Network (OTN) switch, Wave Division Multiplexed (WDM)/Dense WDM (DWDM) platform, etc. into a single, high-capacity intelligent switching system providing Layer 0, 1, and/or 2 consolidation, namely a POTS. In another exemplary embodiment, the node 400 can be any of an OTN Add/Drop Multiplexer (ADM), a Multi-Service Provisioning Platform (MSPP), a Digital Cross-Connect (DCS), an optical cross-connect, an optical switch, a router, a switch, a Wavelength Division Multiplexing (WDM) terminal, an access/aggregation device, etc. That is, the node 400 can be any digital system with ingress and egress digital signals and switching of channels, timeslots, tributary units, etc. While the node 400 is generally shown as an optical network element, the systems and methods contemplated for use with any switching fabric, network element, or network based thereon.

In an exemplary embodiment, the node 400 includes common equipment 410, one or more line modules 420, and one or more switch modules 430. The common equipment 410 can include power; a control module; operations, administration, maintenance, and provisioning (OAM&P) access; user interface ports; and the like. The common equipment 410 can connect to a management system 450 through a data communication network 460 (as well as a Path Computation Element (PCE), Software Defined Network (SDN) controller, OpenFlow controller, etc.). The management system 450 can include a network management system (NMS), element management system (EMS), or the like. Additionally, the common equipment 410 can include a control plane processor, such as a controller 500 illustrated in FIG. 14 configured to operate the control plane as described herein. The node 400 can include an interface 470 for communicatively coupling the common equipment 410, the line modules 420, and the switch modules 430 to one another. For example, the interface 470 can be a backplane, midplane, a bus, optical or electrical connectors, or the like. The line modules 420 are configured to provide ingress and egress to the switch modules 430 and to external connections on the links to/from the node 400. In an exemplary embodiment, the line modules 420 can form ingress and egress switches with the switch modules 430 as center stage switches for a three-stage switch, e.g. a three-stage Clos switch. Other configurations and/or architectures are also contemplated. The line modules 420 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, Flexible Ethernet, etc.

Further, the line modules 420 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between as well as future higher rates. The line modules 420 can include wavelength division multiplexing interfaces, short reach interfaces, and the like, and can connect to other line modules 420 on remote network elements, end clients, edge routers, and the like, e.g. forming connections on the links in the network 10. From a logical perspective, the line modules 420 provide ingress and egress ports to the node 400, and each line module 420 can include one or more physical ports. The switch modules 430 are configured to switch channels, timeslots, tributary units, packets, etc. between the line modules 420. For example, the switch modules 430 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; and the like. Specifically, the switch modules 430 can include Time Division Multiplexed (TDM) (i.e., circuit switching) and/or packet switching engines. The switch modules 430 can include redundancy as well, such as 1:1, 1:N, etc. In an exemplary embodiment, the switch modules 430 provide OTN switching and/or Ethernet switching.

Those of ordinary skill in the art will recognize the node 400 can include other components which are omitted for illustration purposes, and that the systems and methods described herein are contemplated for use with a plurality of different network elements with the node 400 presented as an exemplary type of network element. For example, in another exemplary embodiment, the node 400 may not include the switch modules 430, but rather have the corresponding functionality in the line modules 420 (or some equivalent) in a distributed fashion. For the node 400, other architectures providing ingress, egress, and switching are also contemplated for the systems and methods described herein. In general, the systems and methods described herein contemplate use with any network element providing switching of channels, timeslots, tributary units, wavelengths, etc. and using the control plane 20. Furthermore, the node 400 is merely presented as one exemplary node 400 for the systems and methods described herein.

Figure 12:
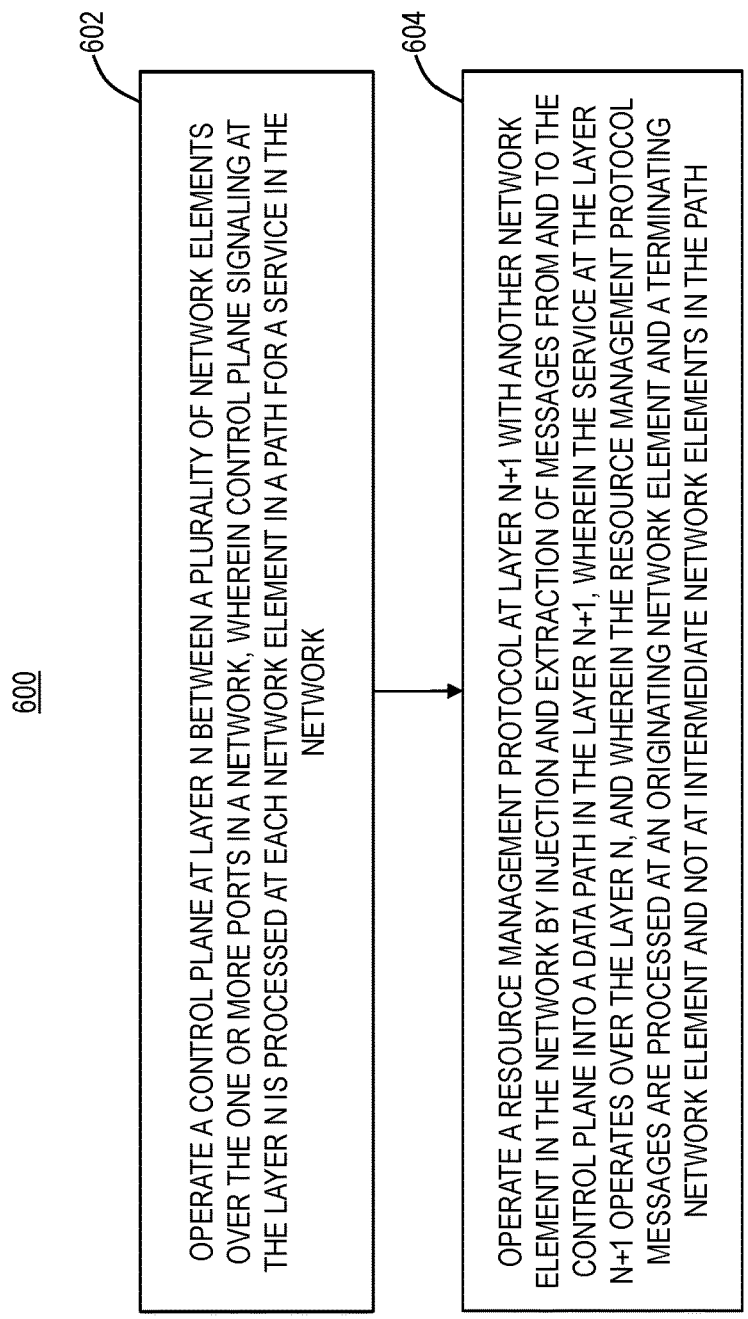
FIG. 12 is a flowchart of process, implemented in a hybrid network element supporting switching at a plurality of layers, for multilayer resource management between the plurality of layers.

In an exemplary embodiment (FIG. 12 which is a flowchart of a process 600), a hybrid network element supporting switching at a plurality of layers, adapted to provide multilayer resource management between the plurality of layers, includes one or more ports; and a controller communicatively coupled to the one or more ports and configured to operate a control plane at Layer N between a plurality of network elements over the one or more ports in a network, wherein control plane signaling at the Layer N is processed at each network element in a path for a service in the network (step 602); and operate a resource management protocol at Layer N+1 with another network element in the network by injection and extraction of messages from and to the control plane into a data path in the Layer N+1, wherein the service at the Layer N+1 operates over the Layer N, and wherein the resource management protocol messages are processed at an originating network element and a terminating network element and not at intermediate network elements in the path (step 604). The control plane for the Layer N is configured to cause the injection and extraction of the messages in the data path at the Layer N+1. The hybrid network element can be a Packet-Optical Transport System supporting both Layer 1 switching and Layer 2 switching. The Layer N can be Time Division Multiplexing (TDM) data, and the Layer N+1 can be packet data. The Layer N can be Optical Transport Network (OTN) data, and the Layer N+1 can be packet data. Intermediate network elements in the path between the network element and the another network element may not operate the resource management protocol for the service but do operate the control plane. The controller can be further configured to utilize the resource management protocol to create and maintain logical ports at the Layer N+1 for the service. The controller can be further configured to utilize the resource management protocol to create and maintain protection resources for the service at the Layer N+1 for backup Layer N+1 endpoints that are reserved and restored with similar efficiency as the Layer N. The resource management protocol exchanges the messages with the another node regardless of a control plane state at intermediate nodes in the path.

Figure 11:
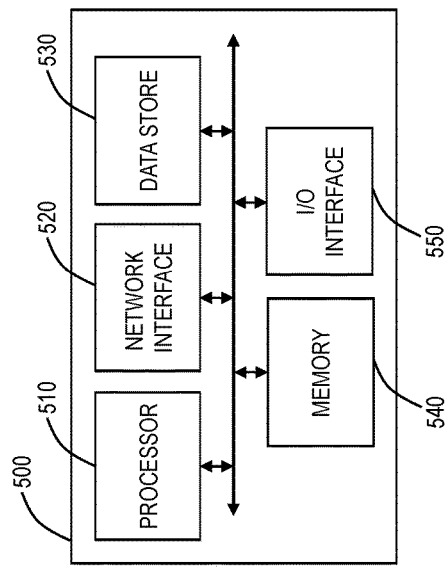
FIG. 11 is a block diagram of a controller to provide control plane processing and/or operations, administration, maintenance, and provisioning (OAM&P) for the node, and/or to implement a Software Defined Networking (SDN) controller

Referring to FIG. 11, in an exemplary embodiment, a block diagram illustrates a controller 500 to provide control plane processing and/or operations, administration, maintenance, and provisioning (OAM&P) for the node 400, and/or to implement the Software Defined Networking (SDN) controller 22. The controller 500 can be part of the common equipment, such as common equipment 410 in the node 400, or a stand-alone device communicatively coupled to the node 400 via the DCN 460. In a stand-alone configuration, the controller 500 can be an SDN controller, an NMS, a PCE, etc. The controller 500 can include a processor 510 which is a hardware device for executing software instructions such as operating the control plane. The processor 510 can be any custom made or commercially available processor, a central processing unit (CPU), an auxiliary processor among several processors associated with the controller 500, a semiconductor-based microprocessor (in the form of a microchip or chip set), or generally any device for executing software instructions. When the controller 500 is in operation, the processor 510 is configured to execute software stored within memory, to communicate data to and from the memory, and to generally control operations of the controller 500 pursuant to the software instructions. The controller 500 can also include a network interface 520, a data store 530, memory 540, an I/O interface 550, and the like, all of which are communicatively coupled to one another and with the processor 510.

The network interface 520 can be used to enable the controller 500 to communicate on the DCN 460, such as to communicate control plane information to other controllers, to the management system 450, to the nodes 400, and the like. The network interface 520 can include, for example, an Ethernet card (e.g., 10BaseT, Fast Ethernet, Gigabit Ethernet) or a wireless local area network (WLAN) card (e.g., 802.11). The network interface 520 can include address, control, and/or data connections to enable appropriate communications on the network. The data store 530 can be used to store data, such as control plane information, provisioning data, OAM&P data, etc. The data store 530 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 530 can incorporate electronic, magnetic, optical, and/or other types of storage media. The memory 540 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 540 may incorporate electronic, magnetic, optical, and/or other types of storage media. Note that the memory 540 can have a distributed architecture, where various components are situated remotely from one another, but may be accessed by the processor 510. The I/O interface 550 includes components for the controller 500 to communicate with other devices. Further, the I/O interface 550 includes components for the controller 500 to communicate with the other nodes, such as using overhead associated with OTN signals.

In an exemplary embodiment, the controller 500 is configured to communicate with other controllers 500 in the network 10 to operate the control plane 20 for control plane signaling. This communication may be either in-band or out-of-band, for the control plane 20. For SONET networks and similarly for SDH networks, the controllers 500 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 500 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. For example, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 500 is configured to operate the control plane 20 in the network 10. That is, the controller 500 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 500 can include a topology database that maintains the current topology of the network based on control plane signaling (e.g., HELLO messages) and a connection database that maintains available bandwidth on the links again based on the control plane signaling. Again, the control plane is a distributed control plane; thus, a plurality of the controllers 500 can act together to operate the control plane using the control plane signaling to maintain database synchronization. In source-based routing, the controller 500 at a source node for a connection is responsible for path computation and establishing by signaling other controllers 500 in the network 10, as well as implementing the resource management protocol 50. For example, the source node and its controller 500 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. which are generally a service. Path computation generally includes determining a path, i.e. traversing the links through the nodes from the originating node to the destination node based on a plurality of constraints such as administrative weights on the links, bandwidth availability on the links, etc.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, implemented in a hybrid network element supporting switching at a plurality of layers, for multilayer resource management between the plurality of layers, the method comprising:
    operating a control plane at Layer N between a plurality of network elements in a network, wherein control plane signaling at the Layer N is processed to control configurable features of the Layer N at each network element in a path for a service in the network;
    operating a resource management protocol at Layer N+1 with another network element in the network by injecting and extracting messages from and to the control plane into a data path in the Layer N+1, wherein the service at the Layer N+1 operates over the Layer N, and wherein the resource management protocol messages are processed to control the service at the Layer N+1 at an originating network element and a terminating network element; and
    utilizing the resource management protocol to create, maintain, and exchange information about logical ports at the Layer N+1 for the service during any of mesh restoration or other user triggered operations comprising Make Before Break to activate, deactivate, switch traffic to and from the logical ports.

2. The method of claim 1, wherein the control plane for the Layer N is configured to cause the injecting and extracting of the messages in the data path at the Layer N+1.

3. The method of claim 1, wherein the hybrid network element is a Packet-Optical Transport System supporting both Layer 1 and Layer 2 switching.

4. The method of claim 1, wherein the Layer N is Time Division Multiplexing (TDM) data and the Layer N+1 is packet data.

5. The method of claim 1, wherein the Layer N is Optical Transport Network (OTN) data and the Layer N+1 is packet data.

6. The method of claim 1, further comprising:
    utilizing the resource management protocol to create and maintain protection resources for the service at the Layer N+1 for backup Layer N+1 endpoints that are reserved and restored with similar efficiency as the Layer N.

7. A hybrid network element supporting switching at a plurality of layers, adapted to provide multilayer resource management between the plurality of layers, the hybrid network element comprising:
    one or more ports; and
    a controller communicatively coupled to the one or more ports and configured to
        operate a control plane at Layer N between a plurality of network elements over the one or more ports in a network, wherein control plane signaling at the Layer N is processed to control configurable features of the Layer N at each network element in a path for a service in the network, and
        operate a resource management protocol at Layer N+1 with another network element in the network by injection and extraction of messages from and to the control plane into a data path in the Layer N+1, wherein the service at the Layer N+1 operates over the Layer N, and wherein the resource management protocol messages are processed to control the service at the Layer N+1 at an originating network element and a terminating network element; and
        utilize the resource management protocol to create, maintain, and exchange information about logical ports at the Layer N+1 for the service during any of mesh restoration or other user triggered operations comprising Make Before Break to activate, deactivate, switch traffic to and from the logical ports.

8. The hybrid network element of claim 7, wherein the control plane for the Layer N is configured to cause the injection and extraction of the messages in the data path at the Layer N+1.

9. The hybrid network element of claim 7, wherein the hybrid network element is a Packet-Optical Transport System supporting both Layer 1 switching and Layer 2 switching.

10. The hybrid network element of claim 7, wherein the Layer N is Time Division Multiplexing (TDM) data and the Layer N+1 is packet data.

11. The hybrid network element of claim 7, wherein the Layer N is Optical Transport Network (OTN) data and the Layer N+1 is packet data.

12. The hybrid network element of claim 7, wherein the controller is further configured to
utilize the resource management protocol to create and maintain protection resources for the service at the Layer N+1 for backup Layer N+1 endpoints that are reserved and restored with similar efficiency as the Layer N.

13. A method, implemented in a hybrid network element supporting switching at a plurality of layers, for multilayer resource management between the plurality of layers, the method comprising:
operating a control plane at Layer N between a plurality of network elements in a network, wherein control plane signaling at the Layer N is processed to control configurable features of the Layer N at each network element in a path for a service in the network;
operating a resource management protocol at Layer N+1 with another network element in the network by injecting and extracting messages from and to the control plane into a data path in the Layer N+1, wherein the service at the Layer N+1 operates over the Layer N, and wherein the resource management protocol messages are processed to control the service at the Layer N+1 at an originating network element and a terminating network element; and
utilizing the resource management protocol to create and maintain protection resources for the service at the Layer N+1 for backup Layer N+1 endpoints that are reserved and restored with similar efficiency as the Layer N.

14. The method of claim 13, wherein the control plane for the Layer N is configured to cause the injecting and extracting of the messages in the data path at the Layer N+1.

15. The method of claim 13, wherein the hybrid network element is a Packet-Optical Transport System supporting both Layer 1 switching and Layer 2 switching.

16. The method of claim 13, wherein the Layer N is Time Division Multiplexing (TDM) data and the Layer N+1 is packet data.

17. The method of claim 13, wherein the Layer N is Optical Transport Network (OTN) data and the Layer N+1 is packet data.

18. The method of claim 13, further comprising:
utilizing the resource management protocol to create, maintain, and exchange information about logical ports at the Layer N+1 for the service during any of mesh restoration or other user triggered operations comprising Make Before Break to activate, deactivate, switch traffic to and from the logical ports.

* * * * *